No. 839,853. PATENTED JAN. 1, 1907.
F. E. IVES.
EXHIBITING DIFFRACTION PHOTOGRAPHS.
APPLICATION FILED OCT. 30, 1905.

Witnesses:
Walker F. Pullinger
Augustus B. Coppes

Inventor:
Frederic E. Ives.
by his Attorneys
Howson & Howson

UNITED STATES PATENT OFFICE.

FREDERIC EUGENE IVES, OF WOODCLIFFE-ON-HUDSON, NEW JERSEY.

EXHIBITING DIFFRACTION-PHOTOGRAPHS.

No. 839,853.      Specification of Letters Patent.      Patented Jan. 1, 1907.

Application filed October 30, 1905. Serial No. 285,162.

*To all whom it may concern:*

Be it known that I, FREDERIC EUGENE IVES, a citizen of the United States, residing in Woodcliffe-on-Hudson, New Jersey, have invented certain Improvements in Exhibiting Diffraction-Photographs, of which the following is a specification.

Diffraction-color photographs consist of three superposed or mixed images printed in fine diffraction-lines in clear gelatin or albumen to represent the three primary colors and their combinations. The spacing of the diffraction-lines is different for the different color elements—say two thousand lines to the inch for the red, two thousand six hundred for the green, and two thousand nine hundred for the blue. Viewed by perfectly diffused transmitted light these photographs are quite invisible, but can be made visible with an approximation to the natural colors by viewing them in a special device with a point or line of light a portion of which is dispersed and laterally displaced by the diffracting-lines of the photograph and focused upon the eye by means of a suitable lens. The source of light is usually a gas or lamp flame turned edgewise to the axis of the lens and at a distance of several feet from it. One objection to this device is that the color of a gas-flame is not suitable for obtaining the best results and another is that some considerable skill is required to make the necessary adjustments, and they are lost again by a very slight disturbance of the instrument. Some of the diffraction-photographs also require to be viewed by first-order spectra and others by second-order spectra in order to give the best results, and the necessary changes of adjustment are troublesome and likely to be very imperfectly performed by any but skilful experts.

The object of my invention is to so exhibit a diffraction-color photograph that satisfactory illumination can be obtained by diffused daylight, and incidentally to permit fixed adjustment and convenient disposition of the various instrumentalities necessary to such exhibition, so that no skill is required in order to obtain successful results.

Figure 1:
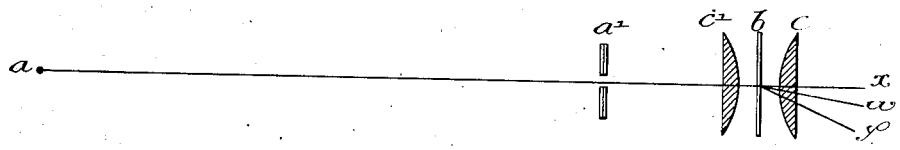
Figure 3:
Figure 2:
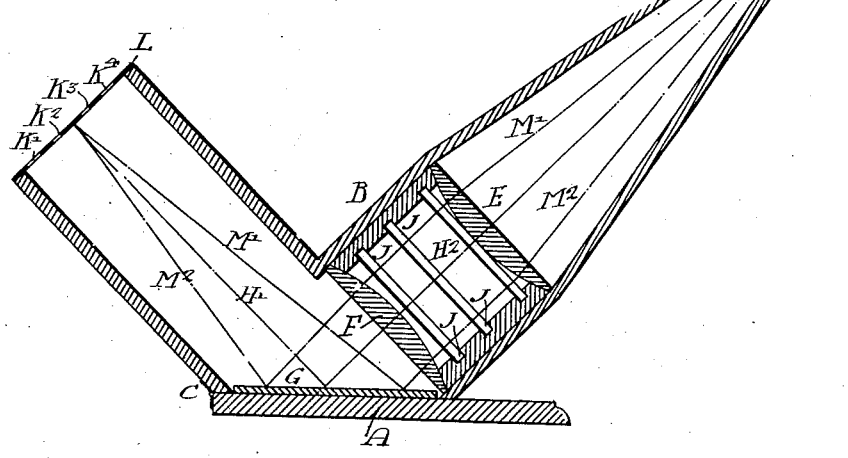

In the accompanying drawings, Figure 1 is a diagrammatic representation of means heretofore employed for exhibiting a diffraction-color photograph. Fig. 2 is a longitudinal sectional view of a device for exhibiting such photographs in accordance with my invention, and Fig. 3 is a plan view of the same.

In Fig. 1 of the drawings, $a$ represents a source of light, $b$ a diffraction-photograph, $c$ a focusing-lens, $x$ a position where the lens $c$ appears filled with white light, and $w$ a position where the graduated spectra of one order are suitably superposed and focused upon the eye—red spectrum rays from one grating photograph-image, green from another, and blue from the third—so that there appears to be a color photograph at $b$. At $y$ spectra of the second order may be similarly utilized. On the other side of the axis are similar spectra, either of which may be utilized. If the axis of the instrument is suitably displaced with respect to the position of $a$, the white light may be made to focus at $w$ and the superposed spectra at $x$, or the white at $y$ and the superposed second-order spectra at $x$. A larger or closer source of light may be used by placing it behind a slit in an opaque screen, such as shown at $a'$, and inserting another lens—such, for instance, as shown at $c'$—to parallelize the rays, and this method of procedure would even admit of the use of diffused daylight but for the fact that where spectra of only one order are utilized, as in the device described, diffused daylight does not give sufficiently strong illumination to be satisfactory.

I overcome the objections to the present procedure, first, by using multiple slits or sources of light so disposed as to utilize two or more of the spectra from each diffraction-image, thus doubling or even under certain conditions quadrupling the illumination; secondly, by attaching the slitted diaphragm to the viewing device so that the adjustments are fixed, and, thirdly, by making a turn in the axis of the instrument with a base-line so disposed as to make the angles of illumination and vision more convenient and satisfactory.

In Fig. 2 of the drawings, A and B represent, respectively, the base and casing of the instrument hinged together at C. D is a slit near the eye-point. E and F are lenses. G is a mirror, and the line $H'$ $H^2$ is the normal optical axis. J represents grooves for receiving the diffraction-photograph slides, and $K'$ $K^2$ $K^3$ $K^4$ are slits in an opaque screen L attached to one end of the case. $M'$ $M^2$ are lines showing the form of a cone of normal axial rays on both sides of the lenses F and E, which are separated not only to permit of the insertion of the diffraction-photograph, but in order to permit of changing its position to suit eyes having either long, normal, or short sight, and this separation may possibly be reduced to some advantage in other respects. From each slit there are therefore three spectra—one by the two thousand line ruling of the diffraction-photograph, one by the two thousand six hundred line diffraction-ruling, and the third by the two thousand nine hundred line diffraction - ruling, and the triple spectra thus produced are so superposed that at one point the mixture is white to the eye.

In the absence of a diffraction-photograph between the lenses E and F light entering the slit D would normally be focused upon the inside of the opaque diaphragm L at its center, and light passing in the other direction through the slits K' K² K³ K⁴ would be thrown above or below the slit D, and so lost to vision. When, however, a diffraction - photograph is inserted between the lenses E F, the diffraction-lines in the photograph, dispersing and deflecting light from D, would throw superposed spectra on all of the slits K' K² K³ K⁴, and, conversely, all of the first and second order spectra obtained from light coming through the slits K' K² K³ K⁴ would be superposed at D. The diffraction-photograph would therefore be seen by the light of four sets of spectra—namely, first and second order spectra—on each side and the illumination would be greatly increased over that which could be obtained by utilizing only one set of spectra. If the slits K' K⁴ belonging to the second-order spectra be made twice as wide as those belonging to the first-order spectra, which is permissible, because the dispersion is twice as great, the illumination may possibly be quadrupled as compared with that obtained with one set of first-order spectra. This arrangement possesses other advantages which may be less obvious, but are of considerable practical importance. For example, some of the diffraction-photographs throw more light into the second-order spectra than into the first, and vice versa, and sometimes the diffraction-lines belonging to one of the superposed or mixed images act differently in this respect from those belonging to the others, and sometimes one side or portion of the diffraction-photograph acts differently in this respect from the other side or portion. The mixing of the several spectra corrects errors thus introduced into single spectrum images and makes the reproductions not only more brilliant, but more correct and harmonious.

In addition to the advantages already enumerated the use of slits horizontally disposed and of appropriate length or appropriately spacedt ogether with diffraction-photographs having the diffraction-lines horizontally disposed permits the images to be viewed with both eyes at once, and I believe that binocular vision with the eyes on opposite sides of the normal axis of a diffraction-photograph-viewing device is also a new and valuable improvement.

The bend in the axis of the instrument provides for the convenient use of a window or other source of light, as well as for convenient viewing of the images.

My improved viewing instrument, while calculated to operate most successfully in diffused daylight, may be very satisfactorily used with artificial light by placing it near the source of light with a ground glass over the diaphragm L, and the color of the light may be modified and improved by adding also a pale cobalt-blue glass or other modifying screen.

I do not herein claim the instrument shown and described, as this forms the subject of a separate application filed by me on the 21st day of March, 1906, Serial No. 307,215.

Having thus described my invention, I claim and desire to secure by Letters Patent—

1. The mode herein described of exhibiting a diffraction-color photograph, said mode consisting in superposing two or more of the triple spectra at the view-point.

2. The mode herein described of exhibiting a diffraction-color photograph, said mode consisting in superposing right and left side spectra at the view-point.

3. The mode herein described of exhibiting a diffraction-color photograph, said mode consisting in superposing spectra of two or more orders at the view-point.

In testimony whereof I have signed my name to this specification in the presence of two subscribing witnesses.

FREDERIC EUGENE IVES.

Witnesses:
WM. E. SHUPE,
JOS. H. KLEIN.